3,154,592
CATALYTIC PYROLYSIS OF FLUOROFORM TO
FORM HIGHER FLUOROCARBONS
Murray Hauptschein, Glenside, and Arnold H. Fainberg, Elkins Park, Pa., assignors to Pennsalt Chemicals Corporation, Philadelphia, Pa., a corporation of Pennsylvania
No Drawing. Filed Dec. 28, 1961, Ser. No. 162,987
4 Claims. (Cl. 260—653)

This invention relates to the production of fluorocarbons by the pyrolysis of fluoroform in the presence of an aluminum fluoride catalyst.

The pyrolysis of fluoroform to produce fluorocarbons is described in U.S. Patent 3,009,966, of Murray Hauptschein and Arnold H. Fainberg. As set out in detail in that patent, it was found that the uncatalyzed pyrolysis of fluoroform produces perfluoroolefins, particularly tetrafluoroethylene and hexafluoropropene, as the major product, with only small quantities of saturated fluorocarbons.

In accordance with the present invention, it has now been found that when the pyrolysis of fluoroform is carried out in the presence of an aluminum fluoride catalyst, the production of saturated fluorocarbons, particularly saturated perfluorocarbons in the $C_1$ to $C_4$ range, is greatly increased at the expense of the unsaturated products. By proper selection of the pyrolysis temperature, a product may be obtained consisting largely of saturated perfluorocarbons principally $CF_4$, $C_2F_6$ and $C_3F_8$, and containing only small amounts of olefinic products. These lower saturated perfluorocarbons display a high degree of chemical inertness and thermal stability, and are useful as low temperature refrigerants, heat exchange fluids and dielectric media.

The preferred aluminum fluoride catalysts useful in carrying out the invention are those prepared by the fluorination of activated alumina. With catalysts prepared in this manner it is not necessary that the fluorination of the alumina be carried to completion, and accordingly such catalysts may contain, in addition to aluminum and fluorine, some oxygen, and it is accordingly understood that the term "aluminum fluoride catalyst" as used herein is intended to include catalysts of this type as well as those consisting essentially of pure $AlF_3$.

Particularly preferred are catalysts prepared by fluorinating activated alumina by treatment at an elevated temperature with a lower fluorocarbon in the manner described hereinafter. In an alternative procedure, alumina may be fluorinated either partially or completely by treatment with hydrogen fluoride at temperatures of e.g. from 200° to 600° C. The exact manner in which the fluorine, aluminum and residual oxygen are associated in catalysts prepared in this manner is not known.

Aluminum fluorides obtained by procedures other than the fluorination of alumina are also suitable as catalysts in the invention. Thus, essentially pure $AlF_3$, as such, or supported on an essentially inert non-siliceous carrier, such as corundum (alpha alumina) or fused beryllia or thoria, may be used. $AlF_3$ of sub-microscopic crystallite size prepared e.g. by treating anhydrous $AlCl_3$ with anhydrous HF as described in U.S. Patent 2,676,996 is generally preferred to conventional aluminum fluorides of relatively large crystal size.

The catalyst can be used in any desired form, e.g. in the form of a fixed bed of pellets, e.g. ⅛" to ½" in size, or as a fluidized bed of find particles in accordance with well known fluidized bed techniques. When employed as a fixed bed of pellets, the reactor may conveniently consist of tubes having a diameter of e.g. ½" to 3" packed with pellets of the catalyst. The catalyst bed can be heated by any desired means such as by an electric furnace surrounding the catalyst-packed tube. The catalyst tubes should be constructed of materials resistant to attack by the reactants or reaction products at the operating temperatures. Preferred materials of this type include, for example nickel, platinum, stainless steel, Inconel, Monel metal or the like.

During the course of the reaction, free carbon is gradually deposited on the catalyst. This causes a gradual decrease in the activity of the catalyst, and after a sufficiently long period, will cause plugging of the catalyst bed. For these reasons, it is desirable periodically to remove this by-product carbon by passing an oxygen containing gas such as air at a controlled temperature of e.g. 500° to 800° C. through the bed to oxidize carbon to CO and $CO_2$, and thus remove it from the catalyst.

The catalytic pyrolysis reaction of the invention is carried out at temperatures of from 500° C. to 1000° C. Optimum temperatures of operation will generally lie in the range of from 650° C. to 900° C. where the best combination of relatively high conversions and good yields of saturated perfluorocarbons in the $C_1$ to $C_4$ range will generally be obtained.

The contact time of the reactants with the catalyst may vary over a wide range depending upon the temperature employed. As the temperature increases shorter contact times are used. Thus, contact times as long as ten minutes at the lower temperatures to as short as 0.01 second at the upper temperature limit may be employed. In the preferred temperature range of from 650° to 900° C., contact times of from 0.5 to 60 seconds will generally be used. As used herein, contact time is defined as follows:

Contact time (seconds)
$$= \frac{\text{volume occupied by catalyst bed}}{\text{volume of gas per second (calculated at reaction temperature and pressure) fed to the catalyst bed}}$$

Reaction pressure is not critical and may be atmospheric, sub-atmospheric, or super-atmospheric. While atmospheric pressure operation will generally be found most convenient, sub-atmospheric pressures, ranging as low as about 25 mm. Hg as a practical limit may be found useful in some cases. Super-atmospheric pressure may range e.g. up to about 10 atmospheres.

The composition of the pyrolysis products will vary somewhat depending upon the reaction conditions, particularly the temperature. In general, higher temperatures favor higher proportions of unsaturated fluorocarbons. Optimum yields of saturated fluorocarbons are generally obtained in the intermediate range of temperatures of 650° C. to 900° C. The olefinic products are principally hexafluoropropene and $C_4$ olefins, mainly perfluoroisobutylene. If desired, the olefinic product may be recycled with fresh fluoroform feed to increase the overall yield of saturated fluorocarbons.

In addition to saturated fluorocarbons ranging from $CF_4$ to $C_4F_{10}$, there is sometimes produced small amounts of perfluorocarbon monohydrides, such as $C_2HF_5$ and $C_3HF_7$. These are probably formed by the addition of hydrogen fluoride split off during the pyrolysis to perfluoroolefins also formed in situ during the pyrolysis.

While the invention does not depend upon any particular reaction mechanism, it is probable that the reaction of the invention involves the following stoichiometry for the various products formed:

(Equation 1) $2CHF_3 \rightarrow CF_4 + C + 2HF$
(Equation 2) $3CHF_3 \rightarrow C_2F_6 + C + 3HF$
(Equation 3) $4CHF_3 \rightarrow C_3F_8 + C + 4HF$
(Equation 4) $5CHF_3 \rightarrow C_4F_{10} + C + 5HF$
(Equation 5) $2CHF_3 \rightarrow C_2HF_5 + HF$
(Equation 6) $3CHF_3 \rightarrow CF_3CF=CF_2 + 3HF$
(Equation 7) $4CHF_3 \rightarrow C_4F_8 + 4HF$ The presence of hydrogen fluoride in the reaction product and the deposition of free carbon on the catalyst in the course of the reaction both lend support to the above reaction mechanism.

PREPARATION OF PREFERRED CATALYSTS

As pointed out above, the most highly preferred catalysts are those prepared by treating activated alumina with a lower fluorocarbon (i.e. a relatively low molecular weight fluorine containing carbon compound). This treatment is carried out by contacting activated alumina with the fluorocarbon in the vapor phase at an elevated temperature at which reaction occurs between the alumina and the fluorocarbon with the evolution of carbon oxides.

Fluorocarbons that may be used to effect the fluorination of the activated alumina may in general be any relatively low molecular weight fluorine containing carbon compound, containing not more than one hydrogen atom and generally containing not more than 8 carbon atoms and preferably of the order of from 1 to 4 carbon atoms. Preferred fluorocarbons are those which in addition to carbon and fluorine contain only elements selected from the class consisting of chlorine and hydrogen, particularly fluoroalkanes of this type. Thus, included in this group are perfluorocarbons (i.e. containing only fluorine and carbon); perfluorochlorocarbons (i.e. containing only carbon, fluorine and chlorine); perfluorohydrocarbons (i.e. containing only carbon, fluorine and hydrogen) and perfluorochlorohydrocarbons (i.e. containing only carbon, fluorine, chlorine and hydrogen); provided always that not more than 1 hydrogen atom is present in the molecule. Typical examples of fluorocarbons suitable for the fluorination of activated alumina to produce the catalyst useful in the invention are $CF_2ClCFCl_2$; $CF_3CCl_3$; $CF_2ClCF_2Cl$; $CF_3CFCl_2$; $CFCl_2CFCl_2$; $CF_2Cl_2$; $CF_3Cl$; $CFCl_3$; $CF_2HCl$; $CHF_3$; $CF_3CF=CF_2$; $CF_3CF_2CF=CF_2$;

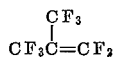

and the like.

In general, any of the many available activated aluminas may be employed to prepare the preferred catalyst. Activated alumina, as is well recognized in the art, is characterized by its relatively high surface area as distinguished from non-activated forms such as corundum or alpha alumina which are dense, low surface materials. Typically, activated aluminas may have surface areas ranging e.g. from 10 to 300 meters² per gram. Desirably, before the fluorination of the alumina by treatment with the fluorocarbon, the alumina is first dried to remove adsorbed moisture. This may be accomplished by heating the activated alumina to a temperature of e.g. 300° C. to 600° C. and preferably 350° to 550° C. for sufficient time to insure the elimination of any free water, e.g. 5 minutes to 5 hours. Desirably, during the drying operation the activated alumina is swept with a stream of an inert gas such as nitrogen.

The treatment of the activated alumina with the fluorocarbon is carried out at elevated temperatures usually ranging from about 150° C. to 900° C. and preferably 300° C. to 700° C. An exothermic reaction occurs between the alumina and the fluorocarbon as evidenced by a rise in the temperature of the catalyst bed. The minimum temperature at which such a reaction may be initiated will vary depending upon the fluorocarbon employed.

Reaction may be initiated at temperatures as low as 150° C. with materials such as $CF_2HCl$ whereas, with materials such as $CF_2Cl_2$ are $CF_2ClCFCl_2$, or $CF_3CF=CF_2$, minimum temperatures of 200° C. or higher are generally required to initiate the reaction.

The principal gaseous reaction products during the activation treatment are carbon oxides. These may be in the form of carbon monoxide, carbon dioxide or both and/or in the form of carbon oxide addition products, particularly $COCl_2$ and/or $COClF$. It is understood that the term carbon oxide is intended to include such addition products as well as carbon dioxide and carbon monoxide. Other products such as tetrachloroethylene, chlorine, hexachloroethane, carbon tetrachloride, chloroform and chlorofluoroalkanes may also be produced where the activating fluorocarbon contains chlorine.

The extent to which it is necessary to carry out the fluorination of the alumina to produce a suitable catalyst will depend somewhat on the temperatures at which the catalyst is to be later operated. In general, the fluorination of the alumina should be carried to such a point that when used as a catalyst for the conversion of fluoroform to other fluorocarbons at a given operating temperature, the reactor effluent contains not more than minor amounts (preferably not over 10% by weight) of carbon oxides. Major amounts of carbon oxides in the reactor effluent indicates insufficient fluorination of the alumina. Higher catalyst operating temperatures will generally require a catalyst of a higher degree of fluorination. The time required to complete the fluorination of the alumina with the fluorocarbon will depend upon the fluorination temperature employed, catalyst particle size, the length and other dimensions of the catalyst bed, and other factors. Typically, the fluorination procedure may require from ½ to 20 hours.

To avoid excessive exotherms in the catalyst bed during fluorination it will often be desirable to carry out the fluorination at progressively increasing temperatures. The initial stages of fluorination occur at relatively lower temperatures than the final stages and good control over reaction rate may be achieved by gradually increasing the fluorination temperature as the fluorination proceeds in accordance with the output of carbon oxides in the reactor effluent.

During fluorination, the fluorine derived from the fluorocarbon is apparently "fixed" in the activated alumina which accordingly shows a considerable weight increase during the fluorination procedure. During subsequent use the catalyst may continue to show a gradual weight increase due to further reaction of fluoroform and/or pyrolysis products with the unreacted alumina.

If desired fluoroform itself may be used to prepare the fluorinated alumina catalyst. Thus when activated alumina is treated with fluoroform at elevated temperatures the first products obtained are carbon oxides, produced concurrently with the fluorination of the alumina. When the fluorination proceeds to a certain point, the output of carbon oxide falls to a low level and the major product becomes the desired fluorocarbons $CF_4$, $C_2F_6$, $C_3F_8$ etc.

Examples 1 to 6

PREPARATION OF CATALYST

An activated alumina is employed in the form of ⅛″ x ⅛″ cylindrical pellets containing over 99% ($H_2O$ free basis) of alumina and low in sodium, iron and silica (0.03% $Na_2O$; 0.08% $Fe_2O_3$; 0.022% $SiO_2$). Before drying it has about a 25% weight loss on ignition at 1000° C. and a surface area of about 230 sq. meters per gram.

A central 15″ section of a nickel tube 32″ long and having an inside diameter of ⅞″ is packed with 167.5 grams (170 milliliter volume) of the activated alumina pellets. The catalyst bed is heated by an insulated electric furnace concentric with the tube and 24″ in length.

Temperatures are measured by thermocouple placed in a slot in the outer wall of the tube at the center of the furnace.

The alumina is heated to 500° C. for 1 hour while sweeping with nitrogen to drive off about 10% by weight of water; the temperature is then allowed to drop to 300° C. Fluoroform is then passed over the alumina pellets while maintaining a temperature of about 300° C. for several hours at a space velocity of 240 volumes of fluoroform (at 0° C. and 760 mm. Hg) per volume of alumina pellets per hour. The major product is carbon monoxide and traces of $CO_2$, with the production of carbon oxides gradually dropping off. The space velocity is then decreased to 60 volumes of fluoroform per hour and the temperature raised in 50° C. increments, with the carbon oxide concentration rising sharply at each increment. In this manner, the temperature is raised to 650° C. over a period of about 6 hours. Treatment with fluoroform is continued at 650° C. until the concentration of carbon oxides in the off gases declines to about 5% by weight of the total exit gases. At this point, the catalyst is ready for use in the conversion of fluoroform to other fluorocarbons.

USE OF THE CATALYST FOR THE CONVERSION OF FLUOROFORM TO OTHER FLUOROCARBONS

The aluminum fluoride catalyst, freshly prepared in the manner described above, is used for the conversion of fluoroform to other fluorocarbons, particularly $CF_4$, $C_2F_6$ and $C_3F_8$ in a series of runs at temperatures varying from 650 to 775° C. and at a space velocity of 60 volumes of fluoroform (at 0° C. for 760 mm. Hg) per volume of catalyst per hour. The reactor effluent is passed through a hydrogen fluoride scrubber consisting of a tube packed with sodium fluoride in pellet form held at 100° C. where hydrogen fluoride is removed, and then collected in refrigerated receivers. Analyses are made by gas-liquid chromatography and infrared spectrum analyses. From the total product analyses, the percent conversion of fluoroform to each product is determined on the basis of the stoichiometry shown in Equations 1 to 7 above. The results obtained are shown in Table I.

As can be seen from the data in Table I, the total conversion increases as the temperature increases from 650° to 775° C. The conversion to carbon monoxide (resulting from further reaction of the fluoroform with alumina) initially about 12 to 13 mole percent (of the order of 4% by weight of total product) drops somewhat with further use of the catalyst as the fluorination of the alumina through reaction with fluoroform becomes more complete. The principal products are saturated perfluorocarbons, mainly $CF_4$ and $C_2F_6$. Small amounts of olefins, $C_3F_6$ and $C_4F_8$ are produced, the proportion of these latter products increasing with increasing temperature. During these runs, the catalyst became jet black in color resulting from the deposit of free carbon during the reaction.

TABLE I

| Example | Temp., ° C. | Percent Conversion of Fluoroform to: | | | | | | | | | | | |
|---|---|---|---|---|---|---|---|---|---|---|---|---|---|
| | | Total Product | Total Saturated Fluorocarbons | Total Unsaturated Fluorocarbons | CO | $CF_4$ | $C_2F_6$ | $C_3F_8$ | $C_4F_{10}$ | $C_2HF_5$ | $C_3F_6$ | $C_4F_8$ | Unidentified |
| 1 | 650 | 38.4 | 28.1 | | 9.9 | 23.3 | 3.5 | 0.8 | | 0.5 | | | 0.4 |
| 2 | 675 | 55.0 | 43.9 | 0.1 | 10.3 | 38.2 | 4.7 | 0.6 | | 0.4 | 0.1 | | 0.7 |
| 3 | 700 | 69.4 | 62.8 | 0.2 | 5.9 | 56.0 | 5.7 | 0.7 | | 0.4 | 0.2 | | 0.5 |
| 4 | 725 | 82.7 | 75.7 | 0.5 | 6.2 | 68.0 | 6.0 | 1.1 | 0.1 | 0.5 | 0.3 | 0.2 | 0.3 |
| 5 | 750 | 86.3 | 80.4 | 1.4 | 4.2 | 70.1 | 7.2 | 1.8 | 0.4 | a 0.9 | 0.7 | 0.7 | 0.3 |
| 6 | 775 | 88.6 | 79.4 | 2.9 | 6.0 | 67.5 | 7.6 | 2.7 | 0.5 | a 1.2 | 1.2 | 1.7 | 0.2 | a Includes 0.1% $C_3HF_7$.

Examples 7 to 9

These examples illustrate the results obtained with a catalyst prepared as in Examples 1 to 6, but after a longer period of use thus providing a catalyst in which the alumina has been more completely converted to aluminum fluoride. The same equipment, methods of analysis, and space velocity are employed as in Examples 1 to 6. The results of three runs at temperatures of from 775° C. to 825° C. are shown in Table II. As can be seen in Table II, the conversion to carbon monoxide, about 3 to 6 mole percent (of the order of 1 to 2 weight percent by weight of total product) is considerably lower than in Examples 1 to 6. At the higher temperatures, the proportionate conversion to unsaturated fluorocarbons is considerably higher than in Examples 1 to 6.

Example 10

Using the same equipment and techniques as described in Examples 1 to 9, fluoroform is passed over an aluminum fluoride catalyst of small crystallite size prepared as described in U.S. 2,676,996, at a space velocity of about 60 volumes of fluoroform (at 0° C. 760 mm. Hg) per volume of aluminum fluoride catalyst per hour at a catalyst temperature of 700° C. The product consists principally of a mixture of $CF_4$, $C_2F_6$ and $C_3F_8$.

It is to be understood that the foregoing embodiments of the invention are for the purposes of illustration only and that the invention is not limited thereto.

TABLE II

| Example | Temp., ° C. | Percent Conversion of Fluoroform to: | | | | | | | | | | | |
|---|---|---|---|---|---|---|---|---|---|---|---|---|---|
| | | Total Product | Total Saturated Fluorocarbons | Total Unsaturated Fluorocarbons | CO | $CF_4$ | $C_2F_6$ | $C_3F_8$ | $C_4F_{10}$ | $C_2HF_5$ | $C_3F_6$ | $C_4F_8$ | Unidentified |
| 7 | 775 | 69.0 | 62.0 | 4.4 | 2.4 | 49.8 | 6.9 | 2.6 | 0.8 | a 1.9 | 1.9 | 2.5 | 0.2 |
| 8 | 800 | 70.5 | 57.6 | 10.1 | 2.6 | 38.6 | 10.0 | 4.8 | 1.0 | b 3.2 | 4.7 | 5.4 | 0.2 |
| 9 | 825 | 82.8 | 62.9 | 15.5 | 4.2 | 37.1 | 15.6 | 6.5 | 0.8 | c 2.9 | 5.7 | 9.8 | 0.2 | a Includes 0.3% $C_3HF_7$.
b Includes 0.6% $C_3HF_7$.
c Includes 0.5% $C_3HF_7$.

We claim:

1. A method for preparing fluorocarbons which comprises pyrolyzing fluoroform in the presence of an aluminum fluoride catalyst at a temperature of 500° C. to 1000° C.

2. A method for preparing fluorocarbons which comprises pyrolyzing fluoroform in the presence of an aluminum fluoride catalyst at a temperature of from 650° C. to 900° C.

3. A method for preparing fluorocarbons which comprises pyrolyzing fluoroform at a temperature of 500° to 1000° C. in the presence of an aluminum fluoride catalyst prepared by the fluorination of activated alumina.

4. A method for preparing fluorocarbons which comprises pyrolyzing fluoroform at a temperature of 650° C. to 900° C. in the presence of an aluminum fluoride catalyst prepared by the fluorination of activated alumina.

References Cited in the file of this patent

UNITED STATES PATENTS

| | | |
|---|---|---|
| 2,551,573 | Downing et al. | May 8, 1951 |
| 3,009,966 | Hauptschein et al. | Nov. 21, 1961 |
| 3,016,405 | Lovejoy | Jan. 9, 1962 |